United States Patent [19]

Brown

[11] 4,251,919
[45] Feb. 24, 1981

[54] GAUGE FOR BRAKE SPIDER

[75] Inventor: Lyle C. Brown, Dallas, Tex.

[73] Assignee: Raybestos-Manhattan, Inc., Trumbull, Conn.

[21] Appl. No.: 93,259

[22] Filed: Nov. 13, 1979

[51] Int. Cl.³ .................................. G01B 3/30
[52] U.S. Cl. .................................. 33/168 B
[58] Field of Search ............ 33/168 R, 168 B, 143 R, 33/143 M, 143 J, 143 K, 158, 180 AT, 181 AT

[56] References Cited

U.S. PATENT DOCUMENTS

| 818,051 | 4/1906 | Ross | 33/469 |
|---|---|---|---|
| 1,249,804 | 12/1917 | Moore | 33/148 G X |
| 2,537,473 | 1/1951 | McCusker | 33/158 |
| 2,693,033 | 11/1954 | Acker et al. | 33/143 M X |

Primary Examiner—Harry N. Haroian
Attorney, Agent, or Firm—Gary, Juettner & Pyle

[57] ABSTRACT

A device for gauging the center distances between a pair adjacent anchor pin openings of a brake spider is described. The device has lugs that fit into the openings, and provision is made for gauging at least two center distances. One of the mugs is movable relative to the other between two different positions. The type of spider is automatically revealed when a correct fit is obtained.

2 Claims, 3 Drawing Figures

GAUGE FOR BRAKE SPIDER

BACKGROUND OF THE INVENTION

This invention relates to measuring devices and more particularly to a gauge to determine the identity of a brake spider and the type of replacement brake shoes to be used.

A conventional brake spider is a bracket affixed at each end of a vehicle axle housing for supporting a brake shoe assembly. Many of these brackets are of the double anchor pin type having a pair of ears with a cylindrical aperture in each ear. A brake shoe has similar apertured ears at one end. A pair of brake shoes are pivotally mounted on the spider with the use of a generally cylindrical anchor pin. The shoes are urged by various arrangements to pivot the shoes on the anchor pins away from and toward the axis of the axle during actuation of the brakes.

Brake spiders of the double anchor pin type are not standarized and require at least two different types of brake shoes that are not interchangeable. Upon removal of the brake shoe, it is very difficult to determine by visual inspection the type of spider and hence the type of replacement brake shoe required.

When relining of brake shoes becomes necessary, one common practice is to replace the entire brake shoe with one having new linings. The average mechanic is faced with the delimma of which type of replacement shoes to be used. An error in choice would not become apparent until the work was completed, and the installation of incorrect shoes might cause brake malfunction or would require additional work to replace the incorrect shoes.

SUMMARY OF THE INVENTION

In accordance with the present invention, it has been found that brake spiders of the double anchor pin type are characterized by the center to center distance between the anchor pin apertures. Such distance is greater for one type than for another type. Although the type of spider could not be determined by mere visual inspector, the gauge of the present invention allows such determination to be made quickly and easily, and without any possibility of error.

The gauge comprises a support body and a pair of lugs extending from one side of the body. At least one of the lugs is movably mounted on the body and is movable toward and away from the other lug into two positions corresponding to the respective center to center distances for two different spiders. Upon movement of the lug into either of the two positions, the brand or type of spider is revealed, while the other type is concealed, in order to provide fool-proof identification of the spider and correct type of brake shoes to be mounted thereon.

THE DRAWING

DESCRIPTION OF THE PREFERRED EMBODIMENT

Figure 1:
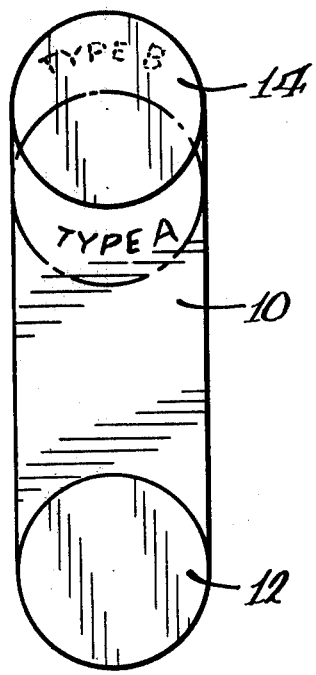
FIG. 1 is a plan view of the spider gauge of the present invention.
Figure 2:
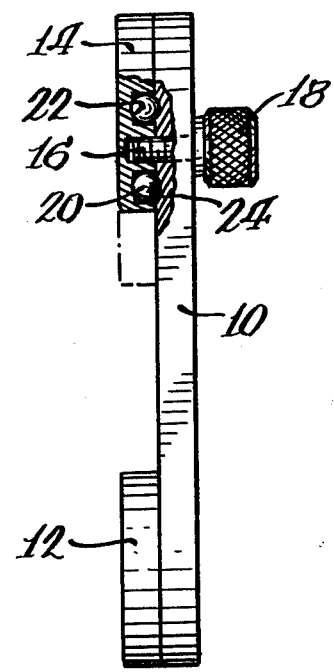
FIG. 2 is a side view, partly in cross section, of the device shown in FIG. 1.

As shown in FIGS. 1 and 2, the gauge of the present invention comprises an elongate support body or bar 10 having a cylindrical lug 12 secured at or near one end thereof. A second cylindrical lug 14 is movably mounted at or near the opposite end of the bar 10. The lugs 12 and 14 project from the same side of the bar in a spaced relation. The diameters of the lugs 12 and 14 and correspond to the standard anchor pin diameter. For the purposes of the present application, the anchor pin diameter will be assumed to be the same for all types or brands of spiders.

The movable lug 14 is mounted so as to be movable between two secure positions as shown in the respective full line and dotted line positions of FIG. 1. Two different spider types or brands are printed or otherwise disposed on the surface of the bar in the positions identified as "Type A" and "Type B" in FIG. 1. The types or identities are spaced in a manner such that one type identity is concealed or covered by lug 14 and the other is exposed when the lug is moved to either of the two positions.

Means are provided for moving the lug into two fixed or secure positions relative to the secured lug 12, thereby to provide a gauge having lugs spaced at two alternative distances. In the preferred embodiment, as shown in FIG. 2, the lug 12 is eccentrically mounted in threaded engagement with a clamp bolt 16 having a knurled end 18, such that the bolt may be tightened and loosened with the fingers.

As shown, the bolt 16 extends from the lug 14 on one side of the bar through an opening in the bar 10 and terminates at the knurled end 18 on the other side of the bar. The bolt 16 engages the cylindrical lug along a line parallel to the axis of the lug but spaced therefrom. The degree of such spacing corresponds to the lineal different between the center to center spacings of the anchor pin openings of two types of spiders. For example, if the center to center distance for one type is 3 inches, and for another type is 2.5 inches, the axis of the bolt 16 would be spaced 0.5 inches from the axis of the lug 14.

In addition, positioning or limit means are provided for locking or otherwise securing the movable lug in each of the two positions. As shown in FIG. 2, one or more balls 20 may be press fitted onto recesses 22 in the bottom surface of the lug 14 such that the balls slightly project from the bottom surface. A recess 24 is provided in the bar to engage with the balls 20 when the lugs 14 is rotated to either of the two desired positions. Obviously, any suitable detent or locking means could be substituted for the one described herein.

Figure 3:
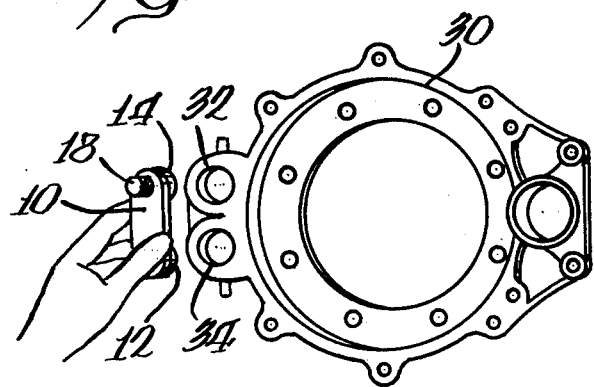
FIG. 3 is a perspective view illustrating application of the gauge to a brake spider.

In order to use the gauge, the clamping bolt 16 is loosened, and the lug is rotated to either of the two positions as shown in FIG. 1. The bolt 16 may then be tightened and the gauge may be applied to a brake spider 30 in the manner shown in FIG. 3. The correct position must be chosen in order that the lugs 12 and 14 will fit into the anchor pin openings 32 and 34 of the brake spider. Upon achieving a fit, the correct type or brand of the spider will be revealed on the face of the gauge.

I claim:

1. A brake spider gauge comprising an elongate bar, a first cylindrical lug secured to said bar near one end thereof, a second cylindrical lug mounted on said bar near the other end thereof, means for positioning said second lug in two positions spaced from the first lug comprising a clamp bolt extending through said bar and threadably engaging said second lug on an axis parallel to the cylindrical axis of said lug but spaced from said axis, and two indicator means corresponding to the respective two positions, one of said indicator means being covered by said second lug while the other indicator means is exposed when said second lug is in either of said two positions.

2. A brake spider gauge for gauging the center to center distances between a pair of spaced anchor pin openings in said spider, said gauge comprising a support, a pair of lugs engageable with said openings mounted on said support, means for supporting one of said lugs in two different spaced positions from the other lug, wherein said one lug is movable over the surface of said body, and indicating means on said surface for indicating the type of brake spider corresponding to the two positions of said one lug, one indicating means being concealed by said one lug while the other is exposed.

* * * * *